United States Patent
Tsao et al.

(10) Patent No.: US 9,778,997 B2
(45) Date of Patent: Oct. 3, 2017

(54) SERVER BACKUP METHOD AND BACKUP SYSTEM USING THE METHOD

(71) Applicant: Industrial Technology Research Institute, Hsinchu (TW)

(72) Inventors: Po-Jui Tsao, Taipei (TW); Yi-Feng Sun, Stony Brook, NY (US); Chuan-Yu Cho, Hsinchu (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 37 days.

(21) Appl. No.: 14/983,540

(22) Filed: Dec. 30, 2015

(65) Prior Publication Data

US 2017/0168901 A1    Jun. 15, 2017

(30) Foreign Application Priority Data

Dec. 14, 2015 (TW) .............................. 104141993 A

(51) Int. Cl.
*G06F 11/14* (2006.01)

(52) U.S. Cl.
CPC ...... *G06F 11/1464* (2013.01); *G06F 11/1451* (2013.01); *G06F 2201/805* (2013.01); *G06F 2201/84* (2013.01)

(58) Field of Classification Search
CPC ............. G06F 11/1448; G06F 11/1451; G06F 11/1461; G06F 11/1465; G06F 2201/805; G06F 2201/84
USPC ........................................... 711/162; 714/6.3
See application file for complete search history.

(56) References Cited

U.S. PATENT DOCUMENTS

| 7,779,295 | B1 | 8/2010 | Shah et al. |
| 7,849,058 | B2 | 12/2010 | Sudo et al. |
| 8,074,035 | B1 | 12/2011 | Per et al. |
| 8,225,109 | B1* | 7/2012 | Kalligudd ........... G06F 11/1456 380/255 |
| 8,983,961 | B2 | 3/2015 | Chan et al. |

(Continued)

FOREIGN PATENT DOCUMENTS

| CN | 102263687 | 11/2011 |
| CN | 104737127 | 6/2015 |

(Continued)

OTHER PUBLICATIONS

"Office Action of Taiwan Counterpart Application", issued on Oct. 31, 2016, p. 1-p. 8, in which the listed references were cited.

(Continued)

*Primary Examiner* — Gary Portka
(74) *Attorney, Agent, or Firm* — Jianq Chyun IP Office

(57) ABSTRACT

A server backup method and a backup system using the server backup method are provided. The server backup method includes continuously collecting a plurality of dirty pages during a running operation and determining a backup start time point according to a quantity of the collected dirty pages. The server backup method also includes suspending the running operation according to the backup start time point and executing a backup snapshot operation to generate a data backup snapshot corresponding to the dirty pages, and executing a backup transmission operation to transmit the data backup snapshot.

18 Claims, 11 Drawing Sheets

(56) References Cited

U.S. PATENT DOCUMENTS

| | | | |
|---|---|---|---|
| 9,015,164 | B2 | 4/2015 | Chan et al. |
| 2010/0107158 | A1 | 4/2010 | Chen et al. |
| 2012/0089572 | A1* | 4/2012 | Raichstein .......... G06F 17/3015 707/645 |
| 2013/0290781 | A1 | 10/2013 | Chen et al. |
| 2014/0149354 | A1 | 5/2014 | Chan et al. |
| 2014/0279922 | A1 | 9/2014 | Kottomtharayil |
| 2015/0370645 | A1* | 12/2015 | Dhanalakoti ....... G06F 11/1461 707/646 |

FOREIGN PATENT DOCUMENTS

| | | |
|---|---|---|
| TW | I438689 | 5/2014 |
| TW | I509426 | 11/2015 |

OTHER PUBLICATIONS

Maohua Lu, et al., "Fast Memory State Synchronization for Virtualization-based Fault Tolerance," IEEE/IFIP International Conference on Dependable Systems & Networks (DSN), Jun. 29-Jul. 2, 2009, pp. 534-543.

Yoshiaki Tamura, et al., "Kemari: Virtual Machine Synchronization for Fault Tolerance," Proceedings of the USENIX Annual Technical Conference, Jun. 22-27, 2008, pp. 1-2.

Brendan Cully, et al., "Remus: High Availability via Asynchronous Virtual Machine Replication," Proceedings of the 5th USENIX Symposium on Networked Systems Design and Implementation (NSDI), Apr. 16-18, 2008, pp. 161-174.

Kai-Yuan Hou, et al., "HydraVM: Low-Cost, Transparent High Availability for Virtual Machines," Technical report, HP Laboratories, HPL-2011-24, Jan. 2011, pp. 1-13.

Kai Li, et al., "Low-Latency, Concurrent Checkpointing for Parallel Programs," IEEE Transactions on Parallel and Distributed Systems, vol. 5, No. 8, Aug. 1994, pp. 874-879.

Michael R. Hines, et al., "Post-Copy Based Live Virtual Machine Migration Using Adaptive Pre-Paging and Dynamic Self-Ballooning," Proceedings of the 2009 ACM SIGPLAN/SIGOPS international conference on Virtual execution environments (VEE), Mar. 11-13, 2009, pp. 51-60.

Balazs Gerofi, et al., "Enhancing TCP Throughput of Highly Available Virtual Machines via Speculative Communication," Proceedings of the 8th ACM SIGPLAN/SIGOPS conference on Virtual Execution Environments (VEE), Mar. 3-4, 2012, pp. 87-96.

* cited by examiner

SERVER BACKUP METHOD AND BACKUP SYSTEM USING THE METHOD

CROSS-REFERENCE TO RELATED APPLICATION

This application claims the priority benefit of Taiwan application serial no. 104141993, filed on Dec. 14, 2015. The entirety of the above-mentioned patent application is hereby incorporated by reference herein and made a part of this specification.

TECHNICAL FIELD

The disclosure relates to a server backup method for a virtual machine (VM) featuring a fault tolerance (FT) mechanism and a backup system using the server backup method.

BACKGROUND

In recent years, the rapid development of internet and the rise of cloud computing lead to the increasing demands of corporations for information services, and therefore the virtual machine (VM) with satisfactory computing capabilities has been extensively applied in various solutions. For instance, a great number of servers with the VMs are combined through internet, so as to create an integrate computer that is characterized by high-speed computing capabilities and large storage capacity and has gained popularity among the corporations.

To prevent massive loss caused by machine halt or data loss resulting from server failure, a virtual fault tolerance (FT) mechanism may be applied to timely switch to another server and provide services without interruption when a server providing the services fails. FIG. 1 is a schematic diagram illustrating a time delay caused by a virtual FT mechanism. With reference to FIG. 1, a backup cycle of a VM with the FT mechanism can be separated into four phases: a running operation, a backup snapshot operation, a backup transmission operation, and an output operation. If a work load request from a user is received in the first three phases and an output for the user's request is generated, the output is temporarily stored in a buffer memory and is sent out in the last phase, i.e., the output operation. That is to say, in the system featuring the virtual FT mechanism, all of the outputs to the user's request are neither released nor transmitted to the user until the first three phases are completed. Thereby, in the system featuring the virtual FT mechanism, an additional delay time is caused. When processing a work load request being sensitive to the time delay, e.g., online games or real-time trading, the response time of the system cannot be guaranteed; what is more, the issue of internet disconnection or transaction failure may arise accordingly. Hence, a method of controlling the delay time in a system featuring the virtual FT mechanism is required for satisfying such work load requests.

SUMMARY

The disclosure provides a server backup method and a backup system using the server backup method, so as to effectively control a work load delay time in a VM featuring an FT mechanism.

In an exemplary embodiment, a server backup method is provided, and the method includes: continuously collecting a plurality of dirty pages during a running operation and determining a backup start time point according to a quantity of the collected dirty pages; suspending the running operation according to the backup start time point and executing a backup snapshot operation to generate a data backup snapshot corresponding to the dirty pages; and executing a backup transmission operation to transmit the data backup snapshot.

In an exemplary embodiment, a backup system that includes a first server and a second server is provided. The first server runs a first VM, and the first VM continuously collects a plurality of dirty pages during a running operation and determines a backup start time point according to a quantity of the collected dirty pages. The second server runs a second VM and couples to the first server through a bus. The first VM suspends the running operation according to the backup start time and executes a backup snapshot operation to generate a data backup snapshot corresponding to the dirty pages and executes a backup transmission operation to transmit the data backup snapshot to the second VM.

In view of the above, the server backup method and the backup system using the method provided in the exemplary embodiments may be applied to dynamically adjust the amount of the collected dirty pages and determine the backup start time point according to the amount of the collected dirty pages and the time of transmitting the collected dirty pages, so as to effectively control the delay time resulting from the FT mechanism of the VM.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

In order to control the work load delay time in a virtual machine (VM) with the fault tolerance (FT) mechanism, the backup start time point is dynamically adjusted in the disclosure, so as to keep the delay time to be within a predetermined range.

Figure 1:
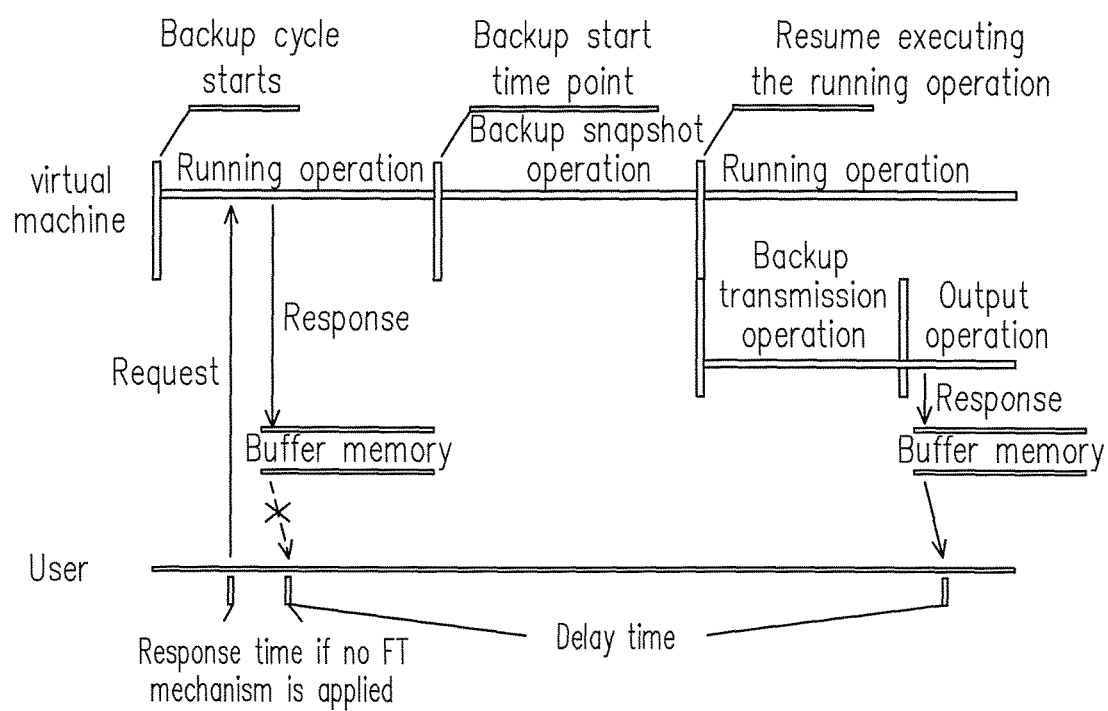
FIG. 1 is a schematic diagram illustrating a time delay caused by a virtual FT mechanism.
Figure 2A:
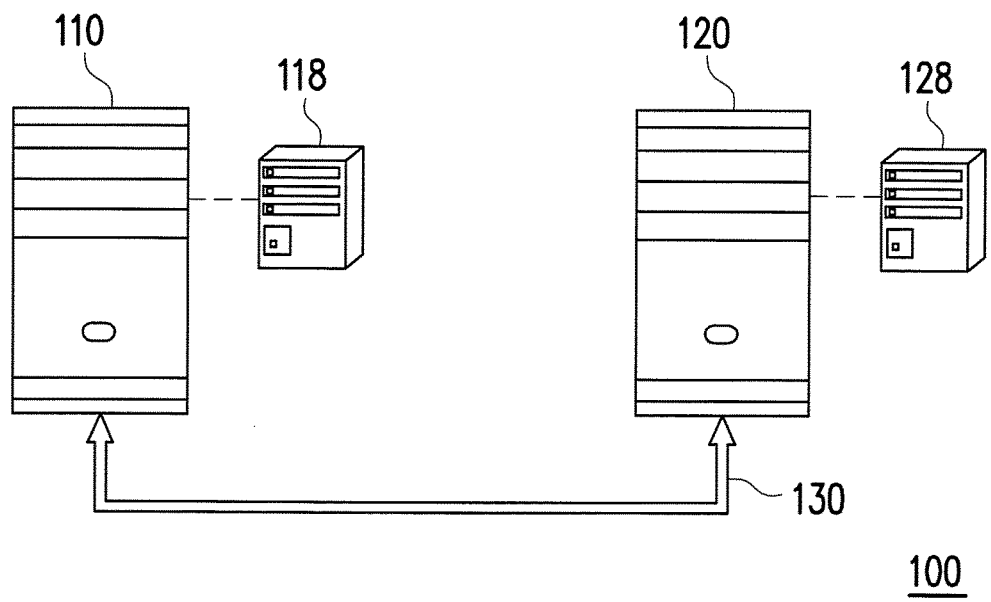
FIG. 2A illustrates a structure of a backup system according to an exemplary embodiment of the disclosure.
Figure 2B:
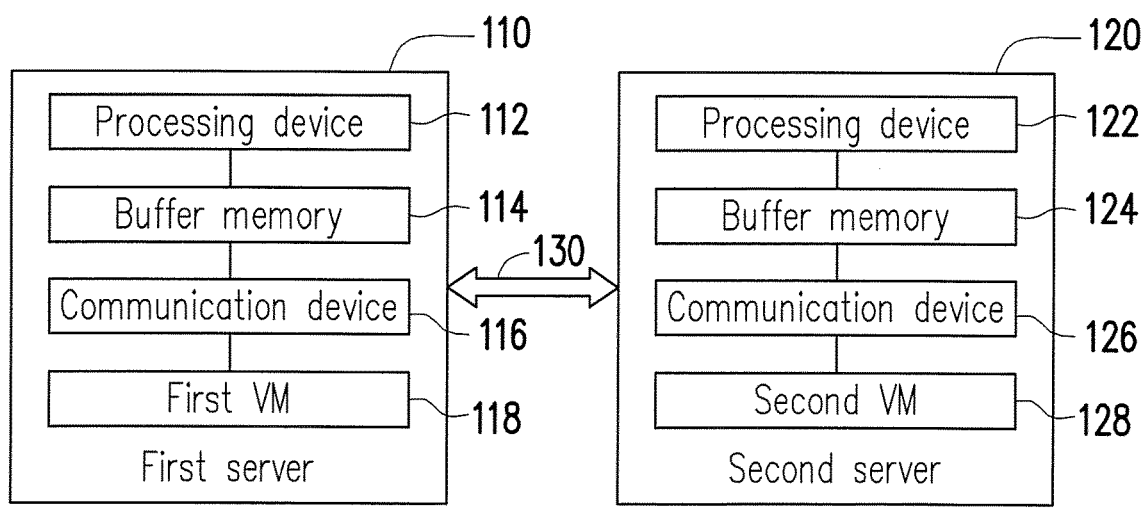
FIG. 2B is a block diagram illustrating a backup system according to an exemplary embodiment of the disclosure.

FIG. 2A illustrates a structure of a backup system according to an exemplary embodiment, and FIG. 2B is a block diagram illustrating a backup system according to an exemplary embodiment. Note that FIG. 2A and FIG. 2B serve to explain the disclosure and should not be construed as limitations to the disclosure.

With reference to FIG. 2A and FIG. 2B, the backup system 100 includes a first server 110 and a second server 120, the first server 110 includes a processing device 112, a buffer memory 114, a communication device 116, and a first VM 118, and a second server 120 includes a processing device 122, a buffer memory 124, a communication device 126, and a second VM 128.

The processing device 112 is coupled to the buffer memory 114 and the communication device 116 and configured to control the overall operation of the first server 110. The processing device 112 is, for instance, a central processing unit (CPU).

The buffer memory 114 is configured to temporarily store command executed by the processing device 122 or data. For instance, the buffer memory 114 may be a dynamic random access memory (DRAM) or a static random access memory (SRAM), which should not be construed as a limitation to the disclosure. Namely, the buffer memory 114 may also be another appropriate memory.

The communication device 116 is configured to establish network connection with other external device through a cable or in a wireless manner. For instance, the first server 110 may be communicated with the second server 120 through the communication device 116.

The processing device 122, the buffer memory 124, and the communication device 126 are similar to the processing device 112, the buffer memory 114, and the communication device 116, and therefore no further explanation is provided hereinafter.

The first server 110 and the second server 120 may run one or more VMs, so as to provide different services. For instance, the first VM 118 is operated on the first server 110, and the second VM 128 is operated on the second server 120. It should be understood that two servers and two VMs are provided in the present exemplary embodiments, which should however not be construed as limitations to the disclosure. The backup system 100 may include two or more servers, and each server may run one or more VMs. The backup system 100 further includes a third server configured to run at least one VM (i.e., the third VM), for instance.

A bus 130 is configured to provide a route for the server to transmit data; for instance, the first server 110 and the second server 120 may transmit data to be processed or accessed by each other through the bus 130. In the present exemplary embodiment, the bus 130 complies with a peripheral component interconnect express (PCIe) standard. Nevertheless, it should be understood that the disclosure is not limited thereto, and the bus 130 may also comply with other standards.

As to the operation of the operating system of the server, pages are applied to manage the memory. If the first VM 118 needs to revise data in a certain record, the first VM 118 reads the page having the data from a hard disk, copies the page to the buffer memory 114, and revises the record in the page. At this time, the page stored in the buffer memory 114 is different from the corresponding page in the hard disk, and therefore the revised page in the buffer memory 114 is a so-called "dirty page".

Figure 3:
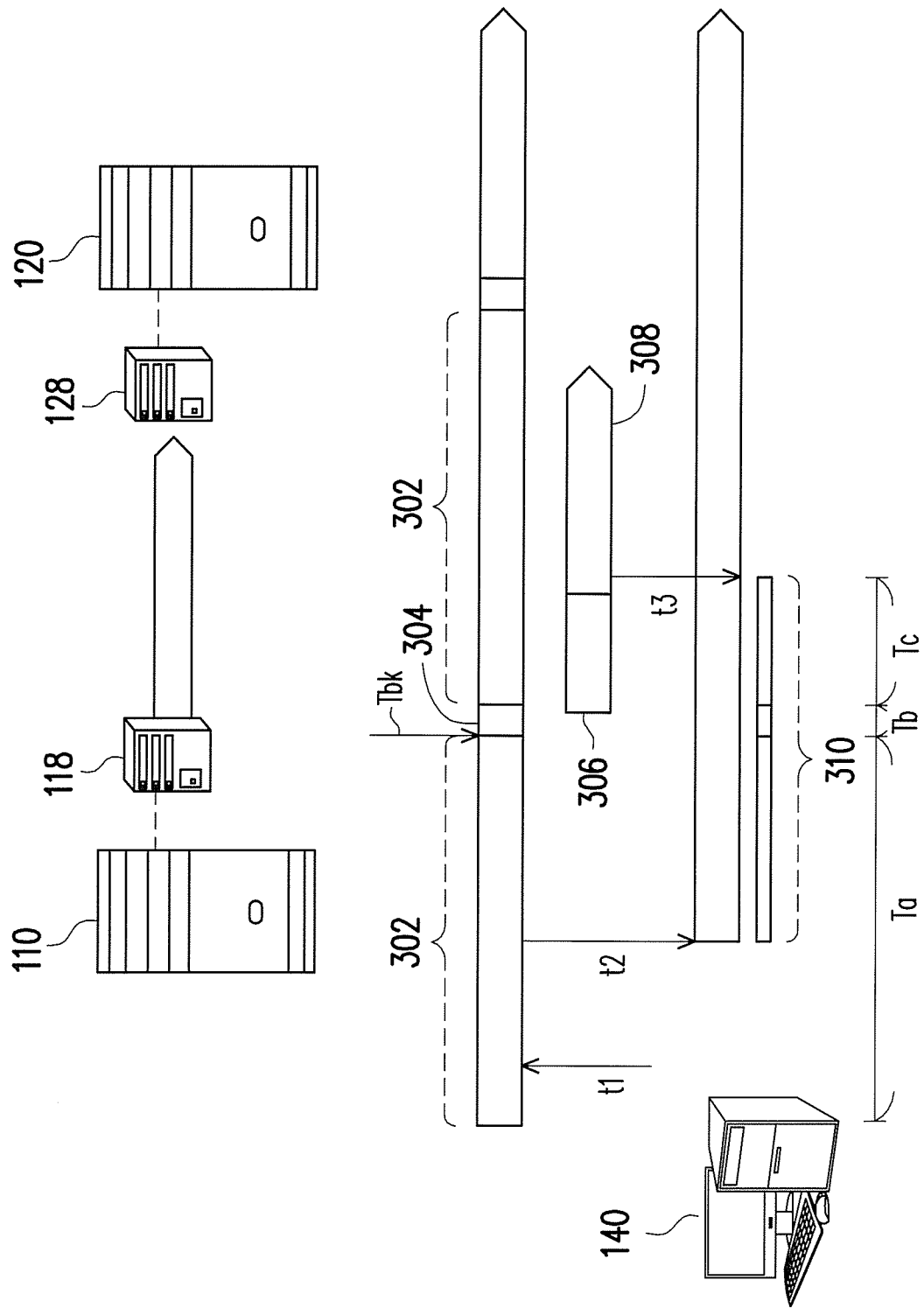
FIG. 3 is a schematic diagram of executing a VM according to an exemplary embodiment of the disclosure.

FIG. 3 is a schematic diagram of executing a VM according to an exemplary embodiment.

With reference to FIG. 3, the backup cycle of the VM with the FT mechanism may be separated into four phases: a running operation 302, a backup snapshot operation 304, a backup transmission operation 306, and an output operation 308. In general, the first VM 118 adds data to the hard disk or revises or accesses the data in the hard disk according to a request command from a user during the running operation 302. For instance, in the running operation 302, the first VM 118 temporarily stores the dirty page and response information in response to the user into the buffer memory 114. After the backup snapshot operation 304 is executed, the dirty page obtained from the running operation 302 may be backed up, so as to generate a data backup snapshot; besides, after the backup snapshot operation 304 is completed, the first VM resumes executing the running operation 302. For instance, a running time of the backup snapshot operation 304 is approximately 1 millisecond (ms)~2 ms. In the backup cycle, the running time of the backup snapshot operation 304 is relatively short and thus may be deemed as having a fixed value in the present exemplary embodiment. The first VM 118 transmits the data backup snapshot to the second VM 128 during the backup transmission operation 306, so as to complete data backup. When the second server 120 acts as the backup server of the first server 110 and the backup system 100 includes plural first servers 110, the second VM 128 may simultaneously support the first VMs 118 of the first servers 110, i.e., the second server 120 may act as the backup server of plural first servers 110. After the transmission of the data backup snapshot, since the data backup snapshot corresponding to the dirty page is already backed up in the second VM 128, the second VM 128 run by the second server 120 may timely take over the task of the first VM 118 run by the first server 110 and provide corresponding services if the first server 110 is damaged and can no longer provide any service. When the backup system 100 further includes the third server, note that the second VM 128 also executes the backup snapshot operation 304 and the backup transmission operation 306, so as to transmit the data backup snapshot to the VM (e.g., the third VM) run by the third server, thereby further enhancing the reliability of the backup mechanism provided herein. During the output operation 308, response information in response to the user is output. For instance, the first VM 118 or the second VM 128 executes the output operation 308 to transmit the response information to an electronic apparatus. The backup transmission operation 306 is mainly executed to transmit the dirty page, and thus the processing time of the backup transmission operation 306 is changed according to the data volume of the transmitted dirty page. As such, the backup system 100 provided herein controls the delay time according to the quantity of the collected dirty pages and the processing time of the backup transmission operation 306. To clearly describe the operation of the backup system 100 and the VMs therein, an exemplary embodiment is provided below with reference to FIG. 3, FIG. 4A, and FIG. 4B.

Figure 4A:
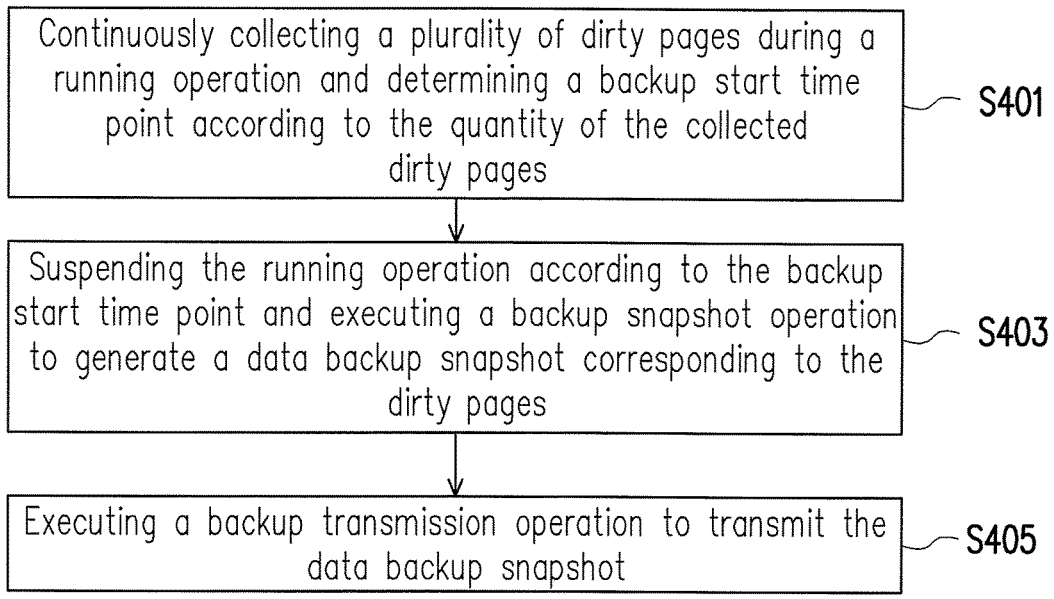
FIG. 4A is a flow chart illustrating a server backup method according to an exemplary embodiment of the disclosure.
Figure 4B:
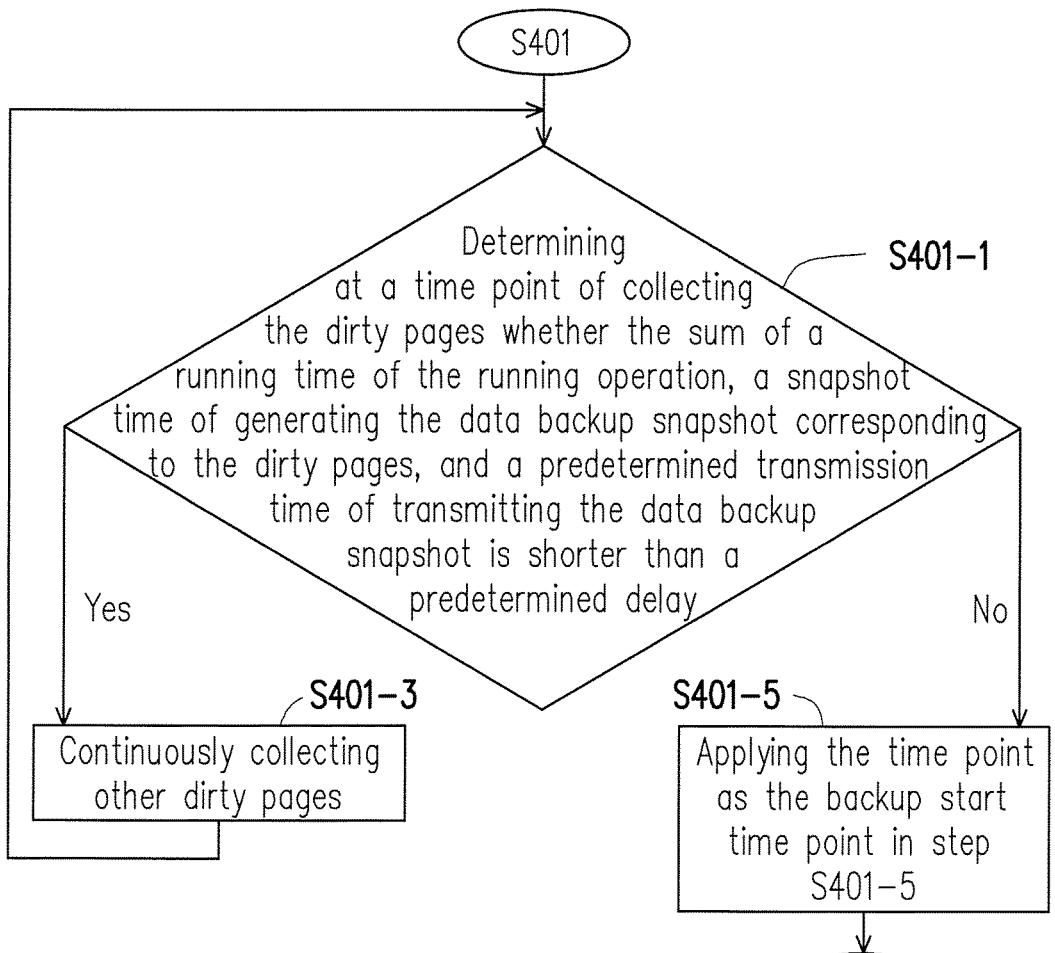
FIG. 4B is a flow chart illustrating a method of determining a backup start time point according to an exemplary embodiment of the disclosure.

FIG. 4A is a flow chart illustrating a server backup method according to an exemplary embodiment, and FIG. 4B is a flow chart illustrating a method of determining a backup start time point according to an exemplary embodiment.

With reference to FIG. 3 and FIG. 4A, in step S401, the first VM 118 continuously collects a plurality of dirty pages during the running operation 302 and determines a backup start time point $T^{bk}$ according to the quantity of the collected dirty pages. In step S403, the first VM 118 suspends the running operation 302 according to the backup start time point $T^{bk}$ and executes the backup snapshot operation 304 to generate the data backup snapshot corresponding to the dirty pages; in step S405, the first VM 118 executes the backup transmission operation 306 to transmit the data backup snapshot to the second VM 128. So far, a backup cycle is completed. If the user in the backup cycle issues a request command to the first VM 118 at the time point $t^1$ through the electronic apparatus 140, the first VM 118 further executes a processing operation according to the request command, so as to obtain response information corresponding to the request command. In a backup system having the VMs that are not characterized by the FT mechanism, after the first VM 118 receives the request command from the electronic apparatus 140 at the time point $t^1$ and executes the processing operation according to the request command to obtain the response information corresponding to the request command, the first VM 118 may then transmit the response information to the electronic apparatus 140 at the time point $t^2$. By contrast, in the backup system having the VMs that are characterized by the FT mechanism, in order to successfully back up all of the dirty pages in the second VM 128, the first VM 118 temporarily stores the response information in the buffer memory 114; after the first VM 118 completely executes the backup snapshot operation 304 and the backup transmission operation 306, the first VM 118 executes the output operation 308 to transmit the response information to the electronic apparatus 140 at the time point $t^3$. The response time from the time point $t^1$ to the time point $t^2$ is fixed, and thus the period from the time point $t^2$ to the time point $t^3$ is defined as the delay time 310. However, the disclosure is not limited thereto; in another exemplary embodiment, the delay time 310 may be a period from the time point $t^1$ to the time point $t^3$.

In the disclosure, the delay time 310 is controlled to be within a certain range, so as to ensure that the response time of the backup system 100 can satisfy the work load requirement that is sensitive to the time delay. In the present exemplary embodiment, the first VM 118 sets a predetermined delay and determines the backup start time point $T^{bk}$ according to the predetermined delay, a running time $T^a$ of the running operation 302, a snapshot time $T^b$ of generating the data backup snapshot corresponding to the dirty pages, and a predetermined transmission time $T^c$ of transmitting the data backup snapshot. Here, the determined backup start time point $T^{bk}$ allows the sum of the running time $T^a$, the snapshot time $T^b$, and the predetermined transmission time $T^c$ to be equal to or shorter than the predetermined delay.

With reference to FIG. 4A and FIG. 4B, in step S401, the first VM 118 at a time point of collecting the dirty pages executes step S401-1 and determines whether the sum of the running time $T^a$ of the running operation 302, the snapshot time $T^b$ of generating the data backup snapshot corresponding to the dirty pages, and the predetermined transmission time $T^c$ of transmitting the data backup snapshot is shorter than the predetermined delay. If the sum of the running time $T^a$ of the running operation 302, the snapshot time $T^b$ of generating the data backup snapshot corresponding to the dirty pages, and the predetermined transmission time $T^c$ of transmitting the data backup snapshot is shorter than the predetermined delay, the first VM 118 continuously collects other dirty pages in step S401-3 and again performs the step S401-1 at another time point after collecting more dirty pages. By contrast, if the sum of the running time $T^a$ of the running operation 302, the snapshot time $T^b$ of generating the data backup snapshot corresponding to the dirty pages, and the predetermined transmission time $T^c$ of transmitting the data backup snapshot is longer than or equal to the predetermined delay, the first VM 118 applies the time point as the backup start time point in step S401-5 and continuously performs step S403.

In the present exemplary embodiment, the predetermined transmission time $T^c$ is estimated according to the data volume of the dirty pages collected in the backup cycle, the transmission amount of the dirty pages collected in the previous backup cycle, and a time of transmitting the previously collected dirty pages. For instance, the first VM 118 calculates a backup transmission speed according to the transmission amount of the previously collected dirty pages and the time of transmitting the previously collected dirty pages and then calculates the predetermined transmission time $T^c$ of transmitting the data backup snapshot according to the backup transmission speed and the data volume of the dirty pages collected in the backup cycle.

For instance, if the first VM 118 sets the predetermined delay as 10 ms, the transmission amount of the previously collected dirty pages is 200 dirty pages, and the time of transmitting the 200 dirty pages is 4 ms, the first VM 118 obtains the backup transmission speed of transmitting 50 dirty pages in 1 ms. Here, the snapshot time $T^b$ corresponding to the backup snapshot operation 304 is assumed to be 1 ms. If the first VM 118 in the running operation 302 collects 100 dirty pages in 2 ms, the first VM 118 determines that there are 7 ms left for transmitting dirty pages after the snapshot time $T^b$ (i.e., 1 ms) is subtracted and further calculates that 2 ms are required for transmitting the 100 dirty pages according to the backup transmission speed. Namely, the sum (i.e., 5 ms) of the running time $T^a$ (i.e., 2 ms), the snapshot time $T^b$ (i.e., 1 ms), and the predetermined transmission time $T^c$ (i.e., 2 ms) is shorter than the predetermined delay (i.e., 10 ms), and thus the first VM 118 continuously collects other dirty pages. Given that the first VM 118 further collects 50 dirty pages in 4 ms (i.e., 6 ms have been spent on collecting the dirty pages, and 150 dirty pages in total have been collected), the first VM 118 determines that there are 3 ms left for transmitting dirty pages after the snapshot time $T^b$ (i.e., 1 ms) is subtracted and further calculates that 3 ms are required for transmitting the 150 dirty pages according to the backup transmission speed. At this time, the sum (i.e., 10 ms) of the running time $T^a$ (i.e., 6 ms), the snapshot time $T^b$ (i.e., 1 ms), and the predetermined transmission time $T^c$ (i.e., 3 ms) is equal to the predetermined delay (i.e., 10 ms), and thus the first VM 118 applies the current time point (i.e., the time point at which the running operation 302 has been executed for 6 ms) as the backup start time point $T^{bk}$.

In another example, the first VM 118 may also determine whether the residual time is enough to transmit the collected dirty pages at the time of generating each dirty page. If the first VM 118 in the running operation 302 collects 99 dirty pages in 7 ms, the first VM 118 determines that there are 2 ms left for transmitting dirty pages after the snapshot time $T^b$ (i.e., 1 ms) is subtracted and further calculates that 1.98 ms are required for transmitting the 99 dirty pages according the backup transmission speed. Although the residual 2 ms are sufficient to transmit 100 dirty pages, the first VM 118 determines that the residual time may be less than 2 ms and is apparently not sufficient to transmit 100 dirty pages if one dirty page is further collected. Hence, the first VM 118 applies the time point (i.e., the time point at which the running operation 302 has been executed for 7 ms) as the backup start time point $T^{bk}$. At this time, the sum (i.e., 9.98 ms) of the running time $T^a$ (i.e., 7 ms), the snapshot time $T^b$ (i.e., 1 ms), and the predetermined transmission time $T^c$ (i.e., 1.98 ms) is shorter than the predetermined delay (i.e., 10 ms).

According to the present exemplary embodiment, note that the predetermined transmission time $T^c$ of transmitting the data backup snapshot is estimated according to the quantity of the dirty pages, which should however not be construed as a limitation in the disclosure. The predetermined transmission time $T^c$ may also be estimated according to the actual transmission speed of the dirty pages (i.e., hereinafter referred to as the compression rate). For instance, in another exemplary embodiment, the predetermined transmission time $T^c$ is estimated according to the data volume of the dirty pages collected in the backup cycle, the compression rate corresponding to the dirty pages collected in the backup cycle, the transmission amount of the dirty pages collected in the previous backup cycle, and a time of transmitting the previously collected dirty pages. Similarly, the first VM 118 also calculates the backup transmission speed according to the transmission amount of the previously collected dirty pages and the time of transmitting the previously collected dirty pages. The difference lies in that the first VM 118 provided in the present exemplary embodiment further calculates the compression rate corresponding to the dirty pages according to the data volume of at least parts of the dirty pages collected in the backup cycle and an actual transmission amount of the at least parts of the dirty pages. That is, the compression rate is the ratio of the actual updated data volume of the collected dirty pages to the quantity of the collected dirty pages. The first VM 118 then calculates the predetermined transmission time $T^c$ of transmitting the data backup snapshot according to the backup transmission speed, the data volume of the dirty pages, and the compression rate corresponding to the dirty pages.

It is assumed that the first VM 118 sets the predetermined delay as 10 ms and obtains the backup transmission speed of transmitting 50 dirty pages in 1 ms. In this example, the first VM 118 calculates the compression rate as long as 10 dirty pages are collected. For instance, the data volume of each dirty page is 4 k, the data volume of the updated data in the 10 dirty pages is 12 k in total, and thus the compression rate corresponding to the 10 dirty pages is 30%. If the first VM 118 collects 30 dirty pages, and if the compression rate corresponding to every 10 of the 30 dirty pages remains at 30%, the first VM 118 assumes that the compression rate corresponding to every 10 dirty pages collected thereafter remains at 30% as well. Note that the frequency of calculating the compression rate is not limited in the disclosure; for instance, in another exemplary embodiment, the quantity of the dirty pages collected at the time point of calculating the compression rate corresponding to the collected dirty pages may be more than or less than 10.

If the first VM 118 in the running operation 302 collects 450 dirty pages in 6 ms, the first VM 118 determines that there are 3 ms left for transmitting dirty pages after the snapshot time $T^b$ (i.e., 1 ms) is subtracted and further calculates the data volume (600 k, i.e., 150 dirty pages) of the actual updated data in the 450 dirty pages according to the compression rate corresponding to the dirty pages. The first VM 118 then further calculates that 3 ms are required for transmitting the 150 dirty pages according to the backup transmission speed. That is, the sum (i.e., 10 ms) of the running time $T^a$ (i.e., 6 ms), the snapshot time $T^b$ (i.e., 1 ms), and the predetermined transmission time $T^c$ (i.e., 3 ms) is equal to the predetermined delay (i.e., 10 ms), and thus the first VM 118 applies the current time point (i.e., the time point at which the running operation 302 has been executed for 6 ms) as the backup start time point $T^{bk}$.

Particularly, if the first VM 118 collects 30 dirty pages and the compression rate corresponding to every 10 of the 30 dirty pages is 30%, 40%, and 50%, respectively, the first VM 118 assumes that the compression rate corresponding to every 10 dirty pages collected thereafter gradually increases. For instance, the first VM 118 assumes that the compression rate corresponding to the next 10 dirty pages is 60%. If the first VM 118 in the running operation 302 collects 70 dirty pages in 8 ms, the first VM 118 determines that there is 1 ms left for transmitting dirty pages after the snapshot time $T^b$ (i.e., 1 ms) is subtracted and further calculates the data volume (168 k, 40*(0.3+0.4+05+0.6+0.7+0.8+0.9)) of the actual updated data in the 70 dirty pages according to the compression rate corresponding to the dirty pages. The first VM 118 then further calculates that 0.84 ms is required for transmitting 168 k of data (equivalent to 42 dirty pages) according to the backup transmission speed. Although the residual 1 ms is sufficient to transmit 50 dirty pages, the first VM 118 determines that the residual time may be less than 1 ms and is apparently not sufficient to transmit 50 dirty pages if the data volume equivalent to 8 more dirty pages is further collected. Hence, the first VM 118 applies the time point (i.e., the time point at which the running operation 302 has been executed for 8 ms) as the backup start time point $T^{bk}$. At this time, the sum (i.e., 9.84 ms) of the running time $T^a$ (i.e., 8 ms), the snapshot time $T^b$ (i.e., 1 ms), and the predetermined transmission time $T^c$ (i.e., 0.84 ms) is shorter than the predetermined delay (i.e., 10 ms). In another exemplary embodiment, the compression rate corresponding to every 10 collected dirty pages may gradually decreases. For instance, the first VM 118 may collect 30 dirty pages, and the compression rate corresponding to every 10 of the 30 dirty pages may be 50%, 40%, and 30%, respectively.

If the VM executes a large volume of input/output operations, e.g., if compiling a kernel or writing a large file into the hard disk, the backup transmission time cannot be estimated; namely, in the backup transmission operation 306, the operation of transmitting the data backup snapshot is affected by other input/output operations, such that the data backup snapshot cannot be transmitted to another VM within the predetermined transmission time $T^c$. A VM manager divides an interrupt process in half, i.e., the top half and the bottom half. In the top half of the interrupt process, tasks corresponding to a interrupt request are received; in the bottom half of the interrupt process, the tasks are scheduled to be performed, so as to sequentially perform the large volume of input/output operations. At this time, since the interrupt process is still being activated, the central processing unit (CPU) can receive an interrupt request. That is to say, the bottom half of process can be interrupted. The VM manager schedules the input/output operations into the interrupt process in order to prevent the input/output operations from occupying the CPU for a long time, which may lead to the fact that other important tasks cannot be executed. However, if the input/output operation corresponding to the backup transmission operation 306 is also scheduled into the interrupt process, the input/output operation corresponding to the backup transmission operation 306 and other input/output operations run by the first VM 118 may be mutually affected, or the input/output operation corresponding to the backup transmission operation 306 may be interrupted. Thereby, the backup transmission time is extended, and thus the overall delay time cannot be controlled. In view of the above, in another exemplary embodiment, the first VM 118 may configure an independent thread to execute the backup transmission operation 306, so as to ensure that the data backup snapshot corresponding to the dirty pages can be transmitted to the second VM 128 within the predetermined transmission time $T^c$. For instance, the first VM 118 may configure a first thread to execute the backup transmission operation 306 and configure a second thread to execute the processing operation, the running operation 302, the backup snapshot operation 304, and the output operation 308. Besides, the first VM 118 decides that a priority of the first thread is higher than a priority of the second thread. Thereby, the operation of transmitting the data backup snapshot corresponding to the dirty pages in the backup transmission operation 306 is not influenced by other input/output operations and is thus not interrupted, and the data backup snapshot corresponding to the dirty pages can certainly be transmitted to the second VM 128 within the predetermined transmission time $T^c$, so as to effectively control the delay time 310.

Figure 5A:
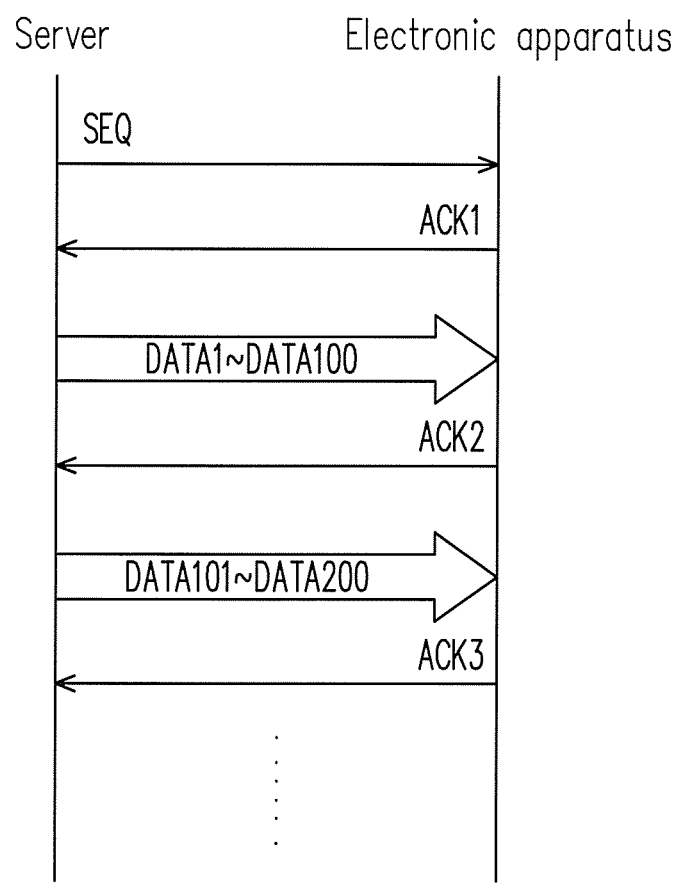
FIG. 5A is a schematic diagram illustrating mass data transmission through a transmission control protocol (TCP).
Figure 5B:
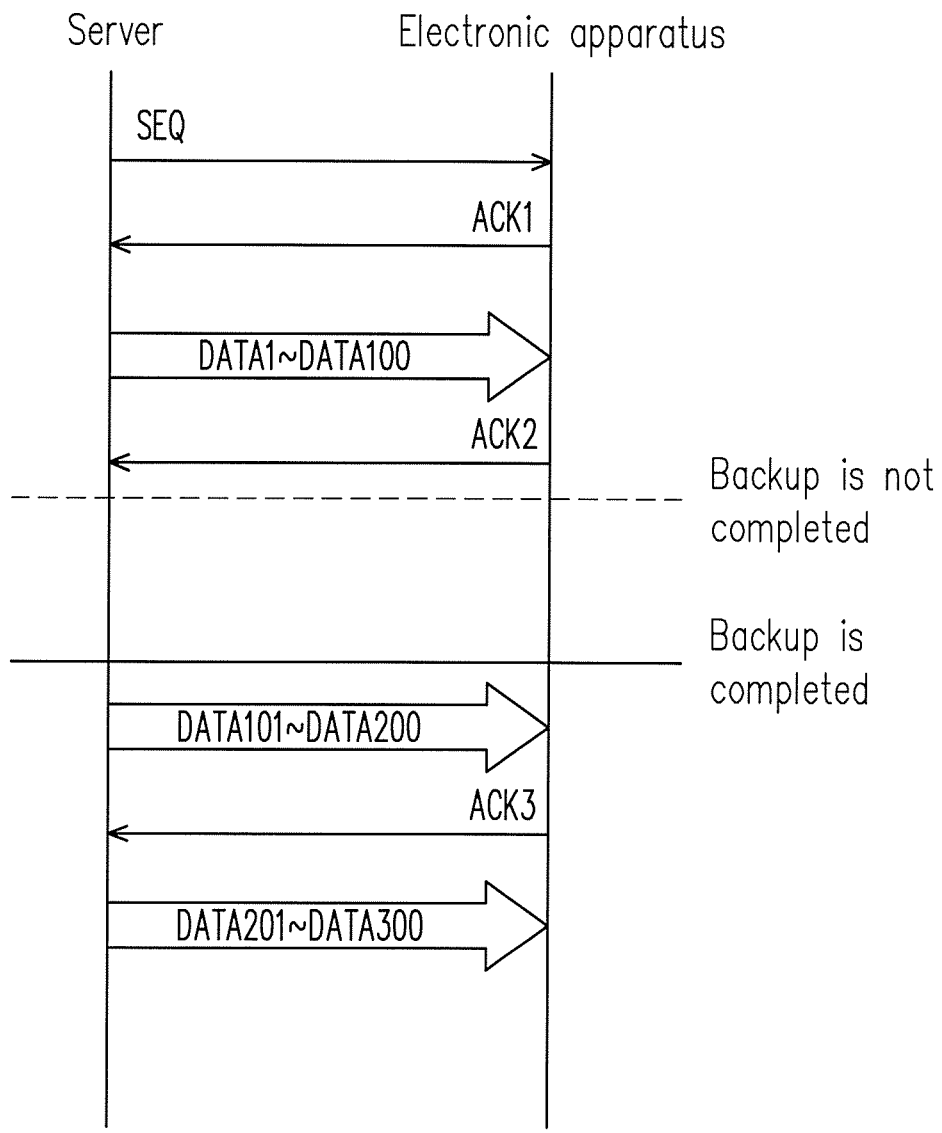
FIG. 5B is a schematic diagram illustrating mass data transmission through the TCP with fault tolerance.

In the disclosure, the backup system 100 transmits the large amount of data through the transmission control protocol (TCP); however, applying the TCP to the VM having the FT mechanism leads to the significant amount of time delay. FIG. 5A is a schematic diagram illustrating mass data transmission through a TCP, and FIG. 5B is a schematic diagram illustrating mass data transmission through the TCP with fault tolerance. With reference to FIG. 5A, TCP is a highly reliability packet exchange protocol for providing the reliability data stream transmission service among hosts. In order to prevent loss of the packets, each packet receives a serial number issued under the TCP, so as to ensure that the packets sent to the user's electronic apparatus are sequentially received. The user's electronic device then sends an acknowledgement message (ack) corresponding to the successfully received packet. If the server at the transmitting end does not receive any acknowledgement message within the reasonable delay time, the corresponding data packet is deemed as a lost packet and is thus re-transmitted. For instance, as shown in FIG. 5A, when the server transmits a large file or a large amount of data, the server firstly sends a sequence packet SEQ; after the server receives the acknowledgement message ACK1, the server starts to transmit response information corresponding to the request command of the user. The server may, for instance, transmit a portion of the response information DATA1-DATA100 to the user, and after the user's electronic device receives the portion of response information DATA1-DATA100 and sends an acknowledgement message ACK2 back to the server, the server continues to transmit the next portion of response information DATA101-DATA200 to the user's electronic device. Said operation will be repeatedly performed until the response information is completely transmitted.

With reference to FIG. 5B, the response information in response to the user's request command is output to the user's electronic device in the output operation 308 after the backup is completed (i.e., after the running operation 302, the backup snapshot operation 304, and the backup transmission operation 306 are completed); therefore, as shown in FIG. 5B, if the backup is not completed, although the server receives the acknowledgement message ACK2, the server does not send out the response information DATA101-DATA200, and thus the user's electronic device does not send out the acknowledgement message ACK3. That is, even though the time for transmitting the response information DATA201-DATA300 to the user's electronic device is sufficient, the server end does not transmit the response information DATA201-DATA300, which leads to significant time delay.

Figure 6:
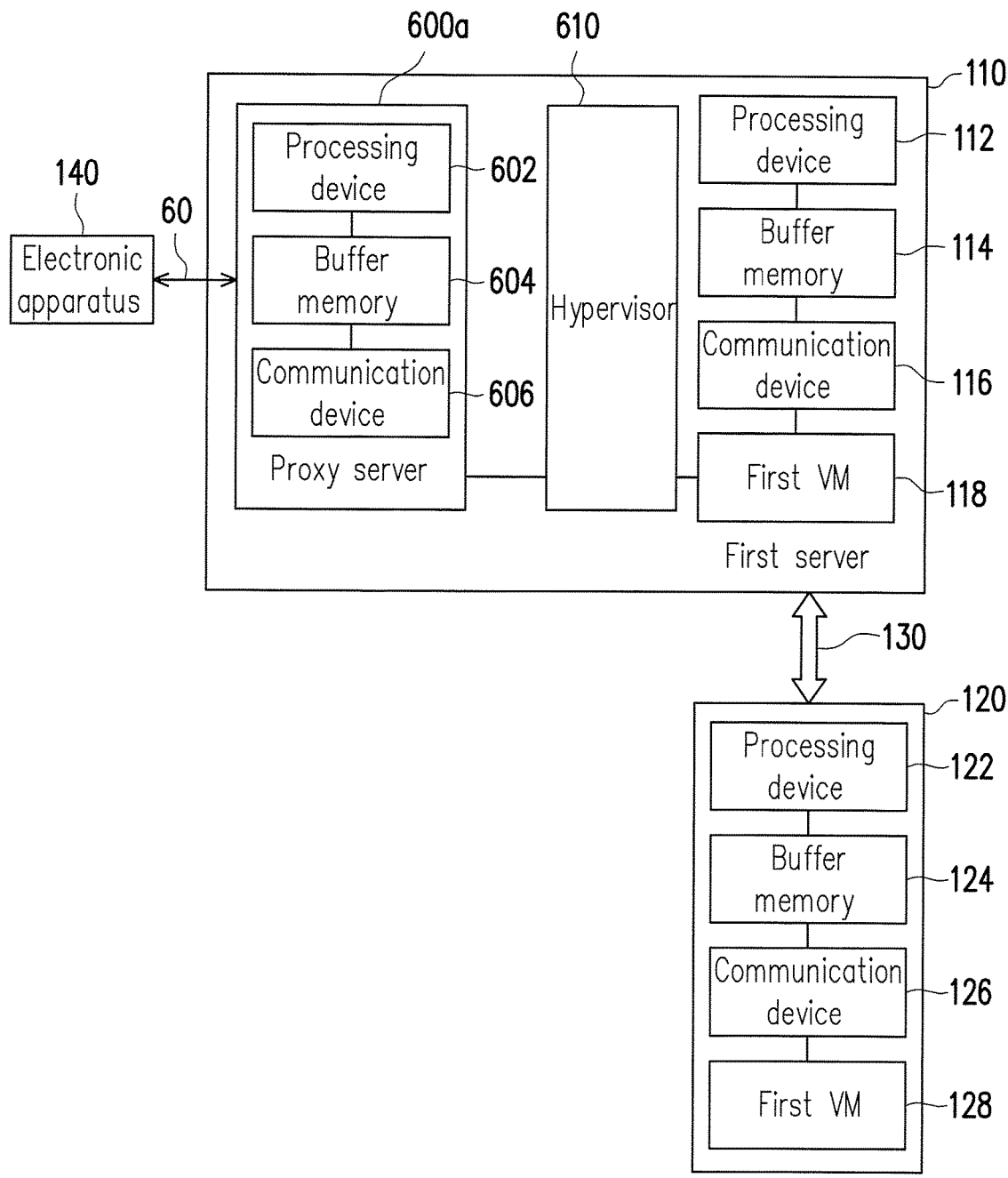
FIG. 6 is a block diagram illustrating a backup system according to another exemplary embodiment of the disclosure.
Figure 7:
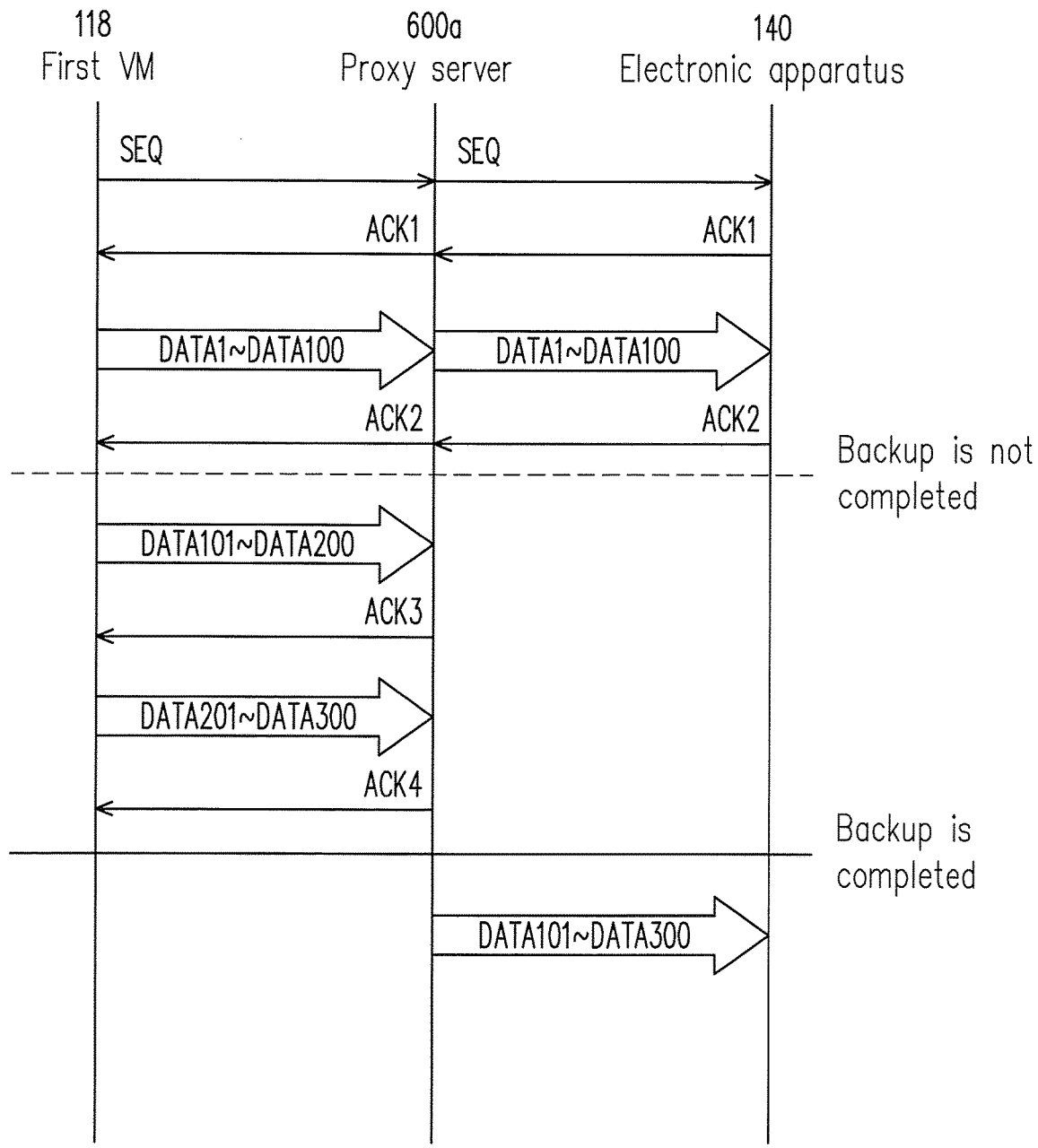
FIG. 7 is a schematic diagram illustrating an operation of a proxy server according to another exemplary embodiment of the disclosure.

FIG. 6 is a block diagram illustrating a backup system according to another exemplary embodiment and FIG. 7 is a schematic diagram illustrating an operation of a proxy server according to another exemplary embodiment.

With reference to FIG. 6, in order to resolve the issue of significant time delay caused by applying the TCP to the VM having the FT mechanism, the backup system 100 provided herein may be further equipped with a proxy server 600*a*. The first server 110 may further include a hypervisor 610, and the proxy server 600*a* and the first VM 118 are operated on the hypervisor 610. Here, the hypervisor 610 is an intermediate software layer between a physical host (e.g., the first server 110) and an operating system and is also referred to as a virtual machine monitor (VMM). For instance, the hypervisor 610 manages the hardware resource in the first server 110, so as to properly allocate the hardware resource to the first VM 118. For instance, the CPU in the first server 110 can be allocated to the first VM 118 through the operating system of the first server 110, such that the first VM 118 is able to directly utilize the physical CPU allocated to the first VM 118 and provide relevant services. Besides, the proxy server 600*a* is a computer system or another network terminal providing the proxy service and allows one network terminal (e.g., the electronic apparatus 140) to indirectly connect another network terminal (e.g., the first server 110) through the proxy service. In the present exemplary embodiment, the proxy server 600*a* includes a processing device 602, a buffer memory 604, and a communication device 606. Similarly, the processing device 602 is configured to control the overall operation of the proxy server 600*a*, and the buffer memory 604 is configured to temporarily store the data transmitted between the user end and the server end (e.g., the first server 110). The network connection between the proxy server 600 and the electronic apparatus 140 is established by the communication device 606 through a network 60, and the internal data are transmitted through the hypervisor 610 between the proxy server 600 and the first VM 118 run by the first server 110. The network 60 is a wireless network complying with the wireless fidelity (Wi-Fi) standard, for instance; however, the disclosure is not limited thereto. In another exemplary embodiment, the network 60 may be a worldwide interoperability for microwave access (WiMAX) network, a long term evolution (LTE) network, or any other type of wireless network, for instance.

In the present exemplary embodiment, the proxy server 600*a* substitutes the user's electronic apparatus 140 to send the acknowledgement message to the first VM 118 run by the server end before the backup is completed, such that the first VM 118 is able to sequentially send each portion of the response information to the proxy server 600*a* in advance and temporarily store each portion of the response information in the buffer memory 604. Thereby, after the backup is completed, the proxy server 600*a* can immediately transmit the response information to the user's electronic apparatus 140. The first server 110 and the second server 120 transmit data to be processed or accessed by each other via the bus 130 through another independent network, such that the data transmission between the first server 110 and the second server 120 is not interrupted. Besides, in the present exemplary embodiment, the second server 120 acts as the proxy server of the first server 110, and thus the second server 120 is usually not employed to provide services to the user end.

If, however, the first server 110 is no longer able to provide services to the user end, and the second VM 128 run on the second server 120 takes over the task of the first VM 118 run on the first server 110 and provides corresponding services to the user end, the second server 120 starts to communicate with the proxy server. Here, the proxy server belonging to the second server 120 may also be connected to the electronic apparatus 140 through its communication device via the network 60, for instance.

With reference to FIG. 7, during the backup transmission operation 306 run by the first VM 118, if the proxy server 600a receives one portion (i.e., the first portion) of the response information DATA101-DATA200 from the first VM 118, the proxy server 600a transmits an acknowledgement message ACK3 (i.e., the first acknowledgement message ACK3) in response to the first portion of the response information DATA101-DATA200. After receiving the first acknowledgement message ACK3, the first VM 118 further transmits another portion (i.e., the second portion) of the response information DATA201-DATA300 to the proxy server 600a, and the proxy server 600a then transmits another acknowledgement message ACK4 (i.e., the second acknowledgement message) in response to the second portion of the response information DATA201-DATA300. After the backup transmission operation 306 is completed, the proxy server 600a transmits the first portion of the response information (i.e., DATA101-DATA200) and the second portion of the response information (i.e., DATA201-DATA300) to the electronic apparatus 140. That is, after the backup is completed, the proxy server 600a may send out the response information DATA101-DATA300 at a time in no need of waiting for the user's electronic apparatus 140 to send back the first acknowledgement message ACK3; thereby, the significant time delay caused by applying the TCP to the VM having the FT mechanism may be lessened.

In the present exemplary embodiment, the proxy server 600a is configured to substitute the user end to transmit the acknowledgment message to the server before the backup of the first server 110 to the second server 120 is completed; in addition, if the first server 110 at the server is no longer able to provide services to the user end, the proxy server belonging to the second server 120 may be connected to the electronic apparatus 140 by its communication device through the network 60, so as to timely take over the task of the first server 110 and provide corresponding services to the user end. Hence, if the backup of the first server 110 to the second server 120 is not completed, the proxy server 600a of the first server 110 is required to notify the proxy server of the second server 120 of the current data transmission status, and the data temporarily stored in the buffer memory 604 of the proxy server 600a are backed up in the proxy server of the second server 120.

Figure 8A:
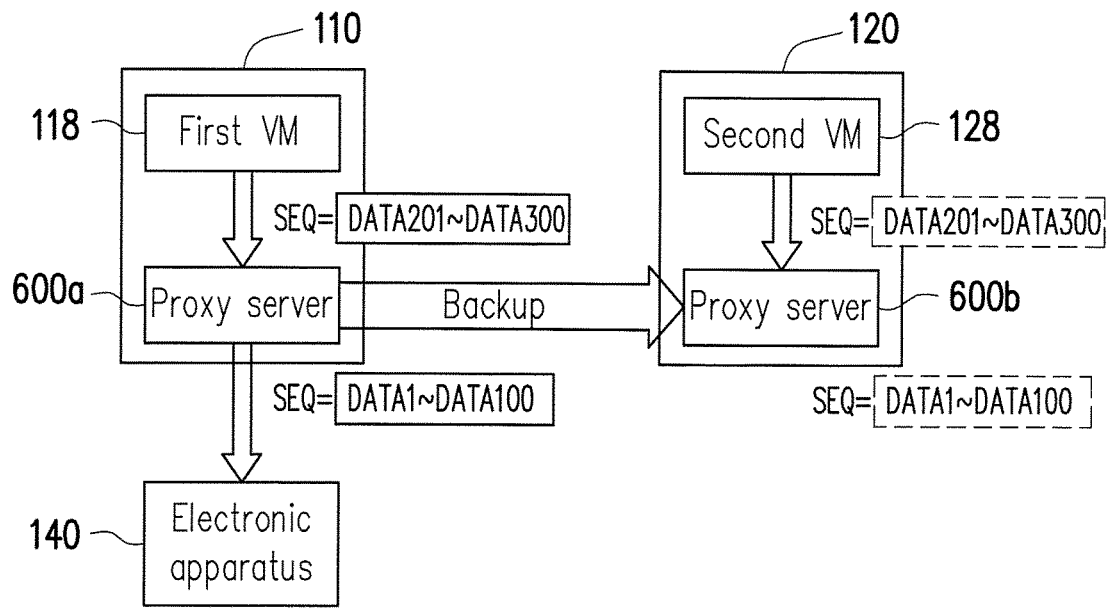
FIG. 8A-FIG. 8C and FIG. 9A-FIG. 9B are schematic diagrams illustrating an operation of a proxy server according to still another exemplary embodiment of the disclosure.
Figure 8B:
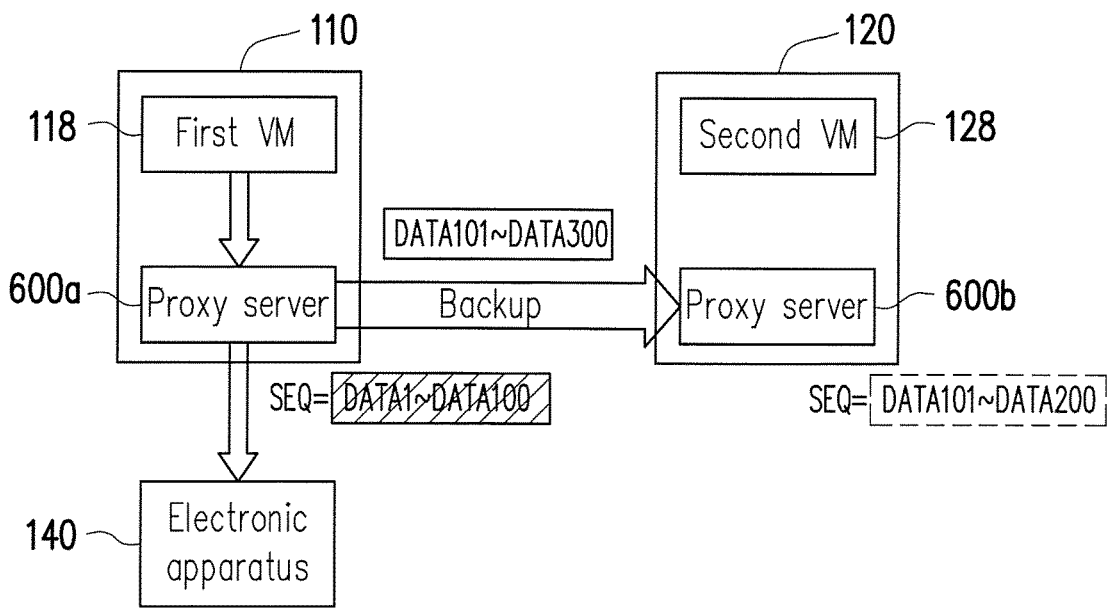
Figure 8C:
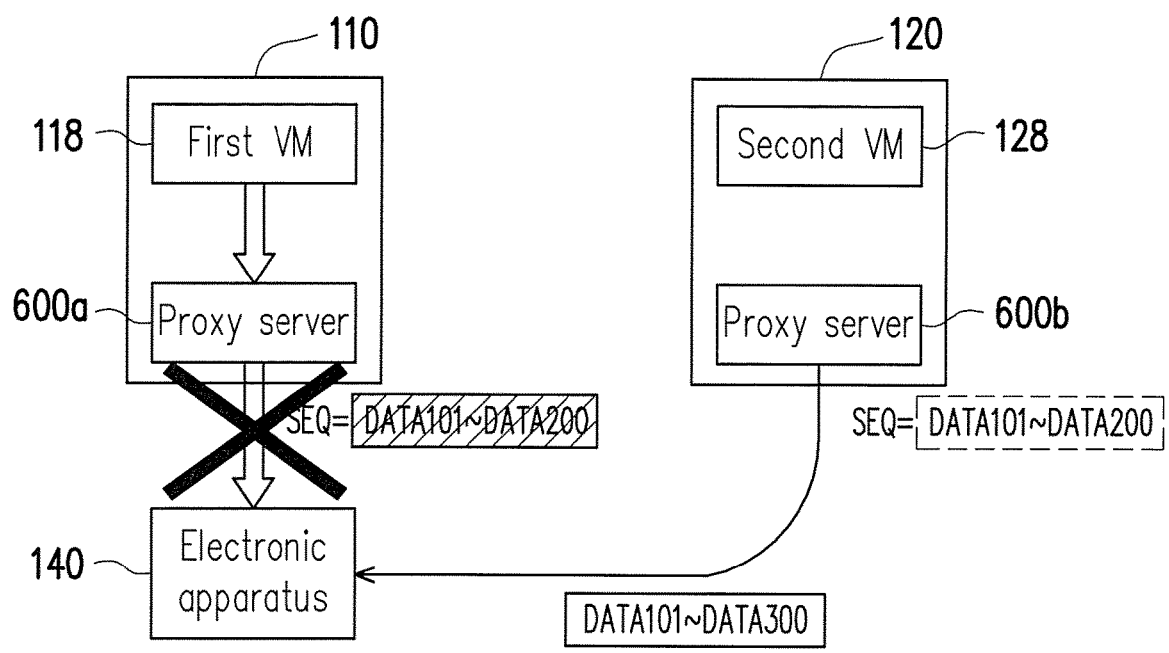
Figure 9A:
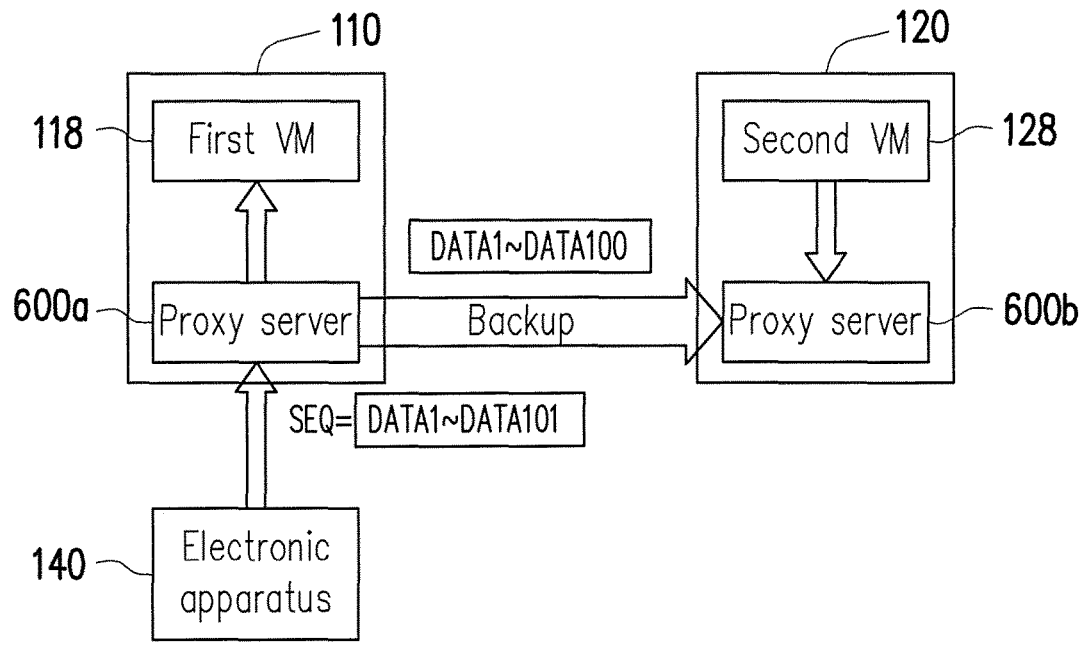
Figure 9B:
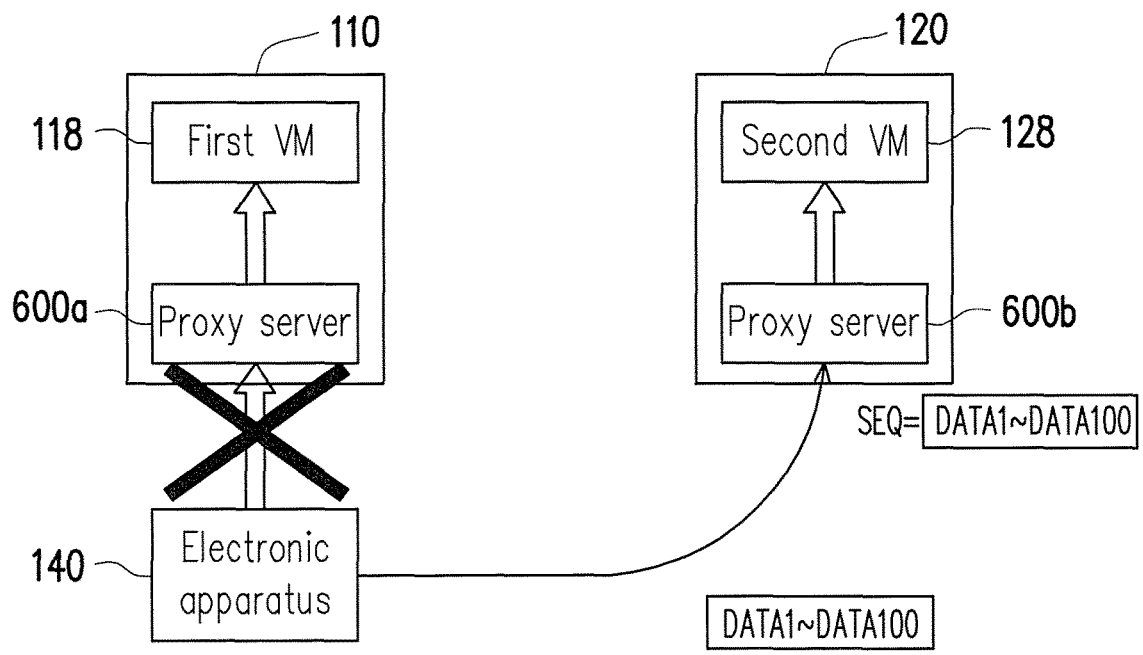

FIG. 8A-FIG. 8C and FIG. 9A-FIG. 9B are schematic diagrams illustrating an operation of a proxy server according to still another exemplary embodiment. FIG. 8A-FIG. 8C illustrate the operation of the proxy server 600a of the first server 110 and the operation of the proxy server 600b of the second server 120 when the server transmits the response information in response to the request command of the user end; FIG. 9A-FIG. 9B illustrate the operation of the proxy server 600a of the first server 110 and the operation of the proxy server 600b of the second server 120 when the user end transmits information to the server end. For illustrative purposes, the first server 110 and the second server 120 shown in FIG. 8A-FIG. 8C and FIG. 9A-FIG. 9B merely include the first VM 118, the proxy server 600a, the second VM 128, and the proxy server 600b. With reference to FIG. 8A, if the proxy server 600a receives the sequence packet SEQ of the response information DATA201-DATA300 from the first VM 118, and only the sequence packet SEQ of the response information DATA1-DATA100 is transmitted by the proxy server 600a to the electronic apparatus 140, the proxy server 600a backs up the current data transmission status in the proxy server 600b of the second server 120. Thereby, the proxy server 600b is able to learn that the proxy server 600a has received the sequence packet SEQ of the response information DATA201-DATA300 and has transmitted the sequence packet SEQ of the response information DATA1-DATA100 to the electronic apparatus 140.

With reference to FIG. 8B and FIG. 8C, if the proxy server 600a intends to transmit the response information DATA101-DATA300 to the electronic apparatus 140 at a time, the proxy server 600a sequentially transmits the sequence packet SEQ of the response information DATA101-DATA200 and the sequence packet SEQ of the response information DATA201-DATA300 to the electronic apparatus 140. Therefore, as shown in FIG. 8B, the proxy server 600a backs up the response information DATA101-DATA300 in the proxy server 600b before transmitting the sequence packet SEQ of the response information DATA101-DATA200; for instance, the response information DATA101-DATA300 is stored into the buffer memory of the proxy server 600b. Thereby, in FIG. 8C, if the first server 110 is no longer able to provide services to the user end, the proxy server 600b of the second server 120 may start to sequentially transmit the sequence packet SEQ of the response information DATA101-DATA200 and the sequence packet SEQ of the response information DATA201-DATA300 to the electronic apparatus 140, so as to complete the transmission of the response information DATA101-DATA300.

With reference to FIG. 9A, in the event that the user end transmits the data to the server end, if the proxy server 600a of the first server 110 receives the sequence packet SEQ of the response information DATA1-DATA100 from the electronic apparatus 140, the proxy server 600a backs up the sequence packet SEQ of the response information DATA1-DATA100 in the proxy server 600b of the second server 120; for instance, the sequence packet SEQ of the response information DATA1-DATA100 is stored in the buffer memory of the proxy server 600b. When the proxy server 600a of the first server 110 backs up the sequence packet SEQ of the response information DATA1-DATA100 in the proxy server 600b of the second server 120, the proxy server 600a transmits the sequence packet SEQ of the response information DATA1-DATA100 to the first VM 118.

In FIG. 9B, if the first server 110 is no longer able to provide services to the user end, the first VM 118 of the first server 110 is unable to send to the electronic apparatus 140 an acknowledgement message corresponding to the successfully received packet (i.e., the sequence packet SEQ of the response information DATA1-DATA100). The electronic apparatus 140 does not receive any acknowledgement message within the reasonable delay time, the electronic apparatus 140 re-transmits the sequence packet SEQ of the response information DATA1-DATA100 to the second server 120, and the proxy server 600b of the second server 120 determines that the sequence packet SEQ of the response information DATA1-DATA100 is already stored in the buffer memory of the proxy server 600b and thus takes over the task executed by the proxy server 600a of the first server 110. For instance, the proxy server 600b transmits the acknowledgement message in response to the sequence packet SEQ of the response information DATA1-DATA100 to the electronic apparatus 140 and transmits the response information DATA1-DATA100 stored in the buffer memory of the proxy server 600b to the second VM 128. If in FIG. 9B the first server 110 can keep on providing services to the user end, it is not necessary for the proxy server 600b to transmit the sequence packet SEQ of the response information DATA1-DATA100 to the second VM 128.

To sum up, the server backup method and the backup system using the method as provided in the exemplary embodiments of the disclosure can be applied to dynamically determine the backup start time point through estimating the time of transmitting the collected dirty pages, so as to control the delay time within the predetermined range and further effectively prevent the services provided in response to the work load request sensitive to the time delay from being terminated because of the excessive time delay. Moreover, the user's experience of operating the service provided by a VM featuring a FT mechanism can also be improved. Besides, an independent thread is configured to execute the backup transmission operation according to an exemplary embodiment of the disclosure, so as to ensure that the data backup snapshot corresponding to the dirty pages can be transmitted to another VM within the predetermined transmission time. In another aspect, the backup system provided herein is equipped with the proxy server that can substitute the user's electronic apparatus to send the acknowledgement message to the VM at the server end, so as to lessen the significant time delay caused by the applying the TCP to the VM having the FT mechanism.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A server backup method comprising:
   setting a predetermined delay;
   continuously collecting a plurality of dirty pages during a running operation and determining a backup start time point according to a quantity of the collected dirty pages, wherein the step of continuously collecting the dirty pages during the running operation and determining the backup start time point according to the quantity of the collected dirty pages comprises:
     determining the backup start time point according to the predetermined delay, a running time of the running operation, a snapshot time of generating the data backup snapshot corresponding to the dirty pages, and a predetermined transmission time of transmitting the data backup snapshot, wherein a sum of the running time, the snapshot time, and the predetermined transmission time is equal to or shorter than the predetermined delay;
   suspending the running operation according to the backup start time point and executing a backup snapshot operation to generate a data backup snapshot corresponding to the dirty pages; and
   executing a backup transmission operation to transmit the data backup snapshot.

2. The server backup method of claim 1, wherein the step of determining the backup start time point according to the predetermined delay, the running time of the running operation, the snapshot time of generating the data backup snapshot corresponding to the dirty pages, and the predetermined transmission time of transmitting the data backup snapshot comprises:
   determining at a time point of collecting the dirty pages whether the sum of the running time, the snapshot time, and the predetermined transmission time is shorter than the predetermined delay;
   if the sum of the running time, the snapshot time, and the predetermined transmission time is shorter than the predetermined delay, continuously collecting other dirty pages; and
   if the sum of the running time, the snapshot time, and the predetermined transmission time is equal to the predetermined delay, applying the time point as the backup start time point.

3. The server backup method of claim 1, further comprising:
   calculating a backup transmission speed according to a transmission amount of previously collected dirty pages and a time of transmitting the previously collected dirty pages; and
   calculating the predetermined transmission time of transmitting the data backup snapshot according to the backup transmission speed and a data volume of the dirty pages.

4. The server backup method of claim 1, further comprising:
   calculating a backup transmission speed according to a transmission amount of previously collected dirty pages and a time of transmitting the previously collected dirty pages; and
   calculating a compression rate corresponding to the dirty pages according to the data volume of at least parts of the dirty pages and an actual transmission amount of the at least parts of the dirty pages; and
   calculating the predetermined transmission time of transmitting the data backup snapshot according to the backup transmission speed, the data volume of the dirty pages, and the compression rate corresponding to the dirty pages.

5. The server backup method of claim 1, further comprising:
   receiving a request command from an electronic apparatus and executing a processing operation according to the request command to obtain response information corresponding to the request command; and
   after executing the backup snapshot operation and the backup transmission operation, executing an output operation to transmit the response information to the electronic apparatus.

6. The server backup method of claim 5, further comprising:
   configuring a first thread to execute the backup transmission operation; and
   configuring a second thread to execute the processing operation, the running operation, the backup snapshot operation, and the output operation,
   wherein a priority of the first thread is higher than a priority of the second thread.

7. The server backup method of claim 6, further comprising:
   configuring a proxy server;
   during the backup transmission operation, transmitting a first portion of the response information to the proxy server, wherein the proxy server transmits a first acknowledgement message in response to the first portion of the response information; and after receiving the first acknowledgement message, transmitting a second portion of the response information to the proxy server, wherein the proxy server transmits a second acknowledgement message in response to the second portion of the response information, wherein after the backup transmission operation is completed, the proxy server transmits the first portion of the response information and the second portion of the response information to the electronic apparatus.

8. The server backup method of claim 1, further comprising:

resuming executing the running operation after completing the backup snapshot operation.

9. A backup system comprising:

a first server configured to run a first virtual machine, wherein the first virtual machine continuously collects a plurality of dirty pages during a running operation and determines a backup start time point according to a quantity of the collected dirty pages; and a second server configured to run a second virtual machine and coupled to the first server through a bus, wherein the first virtual machine is further configured to suspend the running operation according to the backup start time point and execute a backup snapshot operation to generate a data backup snapshot corresponding to the dirty pages and configured to execute a backup transmission operation to transmit the data backup snapshot to the second virtual machine, wherein the first virtual machine is further configured to set a predetermined delay and determine the backup start time point according to the predetermined delay, a running time of the running operation, a snapshot time of generating the data backup snapshot corresponding to the dirty pages, and a predetermined transmission time of transmitting the data backup snapshot, and wherein a sum of the running time, the snapshot time, and the predetermined transmission time is equal to or shorter than the predetermined delay.

10. The backup system of claim 9, wherein the first virtual machine is further configured to determine at a time point of collecting the dirty pages whether the sum of the running time, the snapshot time, and the predetermined transmission time is shorter than the predetermined delay, wherein if the sum of the running time, the snapshot time, and the predetermined transmission time is shorter than the predetermined delay, the first virtual machine is configured to continuously collect other dirty pages, wherein if the sum of the running time, the snapshot time, and the predetermined transmission time is equal to the predetermined delay, the first virtual machine is configured to apply the time point as the backup start time point.

11. The backup system of claim 9, wherein the first virtual machine is further configured to calculate a backup transmission speed according to a transmission amount of previously collected dirty pages and a time of transmitting the previously collected dirty pages, wherein the first virtual machine is further configured to calculate the predetermined transmission time of transmitting the data backup snapshot according to the backup transmission speed and a data volume of the dirty pages.

12. The backup system of claim 9, wherein the first virtual machine is further configured to calculate a backup transmission speed according to a transmission amount of the previously collected dirty pages and a time of transmitting the previously collected dirty pages, wherein the first virtual machine is further configured to calculate a compression rate corresponding to the dirty pages according to the data volume of at least parts of the dirty pages and an actual transmission amount of the at least parts of the dirty pages, wherein the first virtual machine is further configured to calculate the predetermined transmission time of transmitting the data backup snapshot according to the backup transmission speed, the data volume of the dirty pages, and the compression rate corresponding to the dirty pages.

13. The backup system of claim 9, wherein the first virtual machine is further configured to receive a request command from an electronic apparatus and execute a processing operation according to the request command to obtain response information corresponding to the request command, wherein after executing the backup snapshot operation and the backup transmission operation, the first virtual machine is further configured to execute an output operation to transmit the response information to the electronic apparatus.

14. The backup system of claim 13, wherein the first virtual machine is further configured to configure a first thread to execute the backup transmission operation and configure a second thread to execute the processing operation, the running operation, the backup snapshot operation, and the output operation, wherein an execution priority of the first thread is higher than an execution priority of the second thread.

15. The backup system of claim 13, further comprising a proxy server, wherein the first virtual machine during the backup transmission operation is further configured to transmit a first portion of the response information to the proxy server, wherein the proxy server transmits a first acknowledgement message in response to the first portion of the response information, wherein after receiving the first acknowledgement message, the first virtual machine is further configured to transmit a second portion of the response information to the proxy server, wherein the proxy server transmits a second acknowledgement message in response to the second portion of the response information, wherein after the backup transmission operation is completed, the proxy server transmits the first portion and the second portion of the response information to the electronic apparatus.

16. The backup system of claim 13, further comprising a third server configured to run a third virtual machine and coupled to the second server through the bus, wherein the second virtual machine is configured to execute the processing operation when the first server is unable to provide any service, so as to obtain the response information corresponding to the request command, wherein the second virtual machine is further configured to execute the backup snapshot operation and the backup transmission operation, so as to transmit the data backup snapshot to the third virtual machine, and the second virtual machine is further configured to execute the output operation after executing the backup snapshot operation and the backup transmission operation, so as to transmit the response information to the electronic apparatus.

17. The backup system of claim 9, wherein the first virtual machine is further configured to resume executing the running operation after the backup snapshot operation is completed.

18. The backup system of claim 9, wherein the bus complies with a peripheral component interconnect express standard.

\* \* \* \* \*